Figure 1:
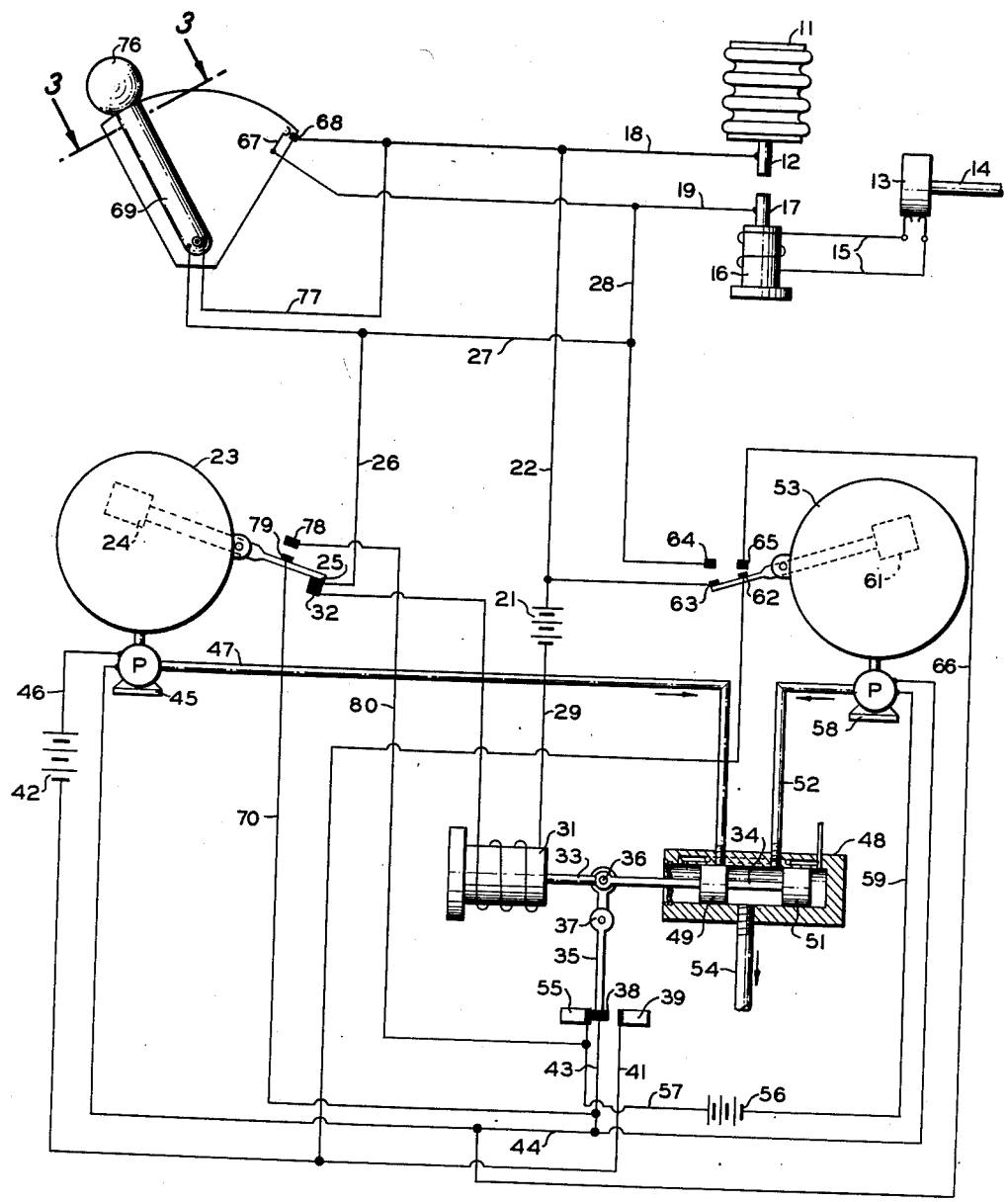

May 11, 1954

D. E. CARR 2,677,930

DEVICE FOR CONTROL OF DUAL FUEL SYSTEMS FOR GAS TURBINES

Filed Oct. 23, 1950

2 Sheets-Sheet 1

INVENTOR.
D. E. CARR

BY Hudson and Young

ATTORNEYS

May 11, 1954
D. E. CARR
2,677,930
DEVICE FOR CONTROL OF DUAL FUEL SYSTEMS FOR GAS TURBINES
Filed Oct. 23, 1950
2 Sheets-Sheet 2
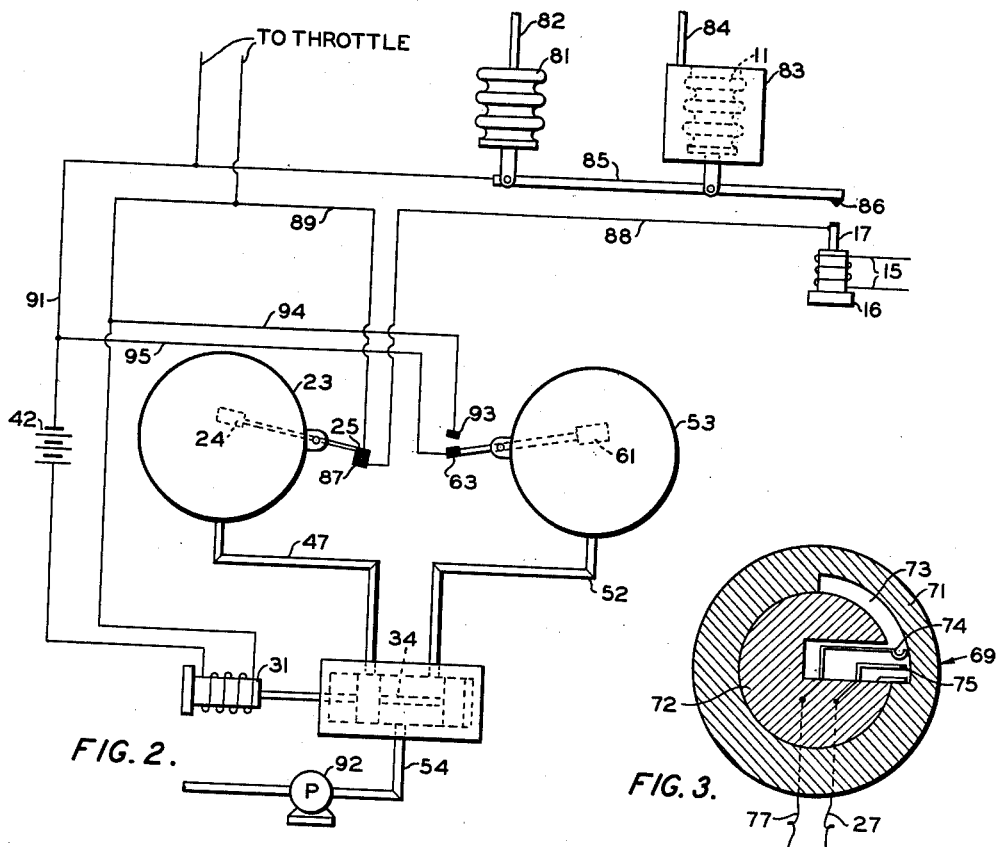
FIG. 2.
FIG. 3.
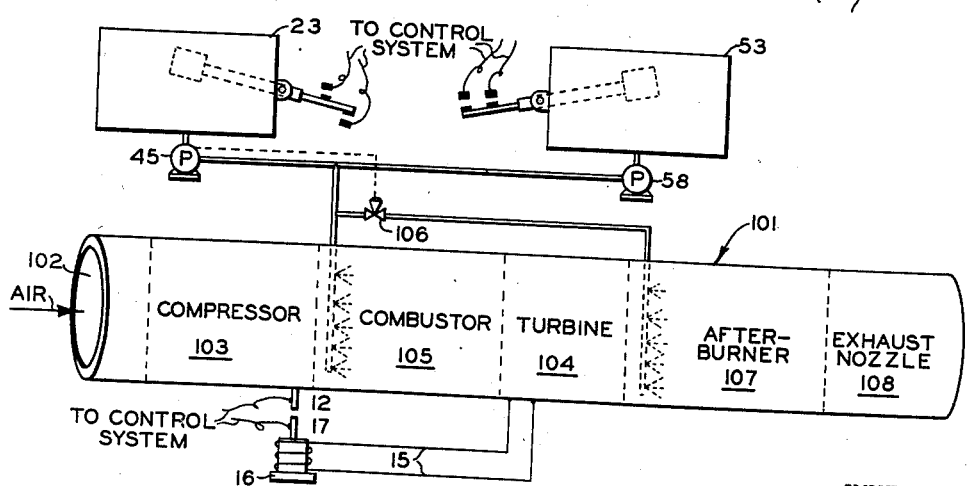
FIG. 4.
INVENTOR.
D. E. CARR
BY Hudson and Young
ATTORNEYS Patented May 11, 1954

2,677,930

UNITED STATES PATENT OFFICE 2,677,930

DEVICE FOR CONTROL OF DUAL FUEL SYSTEMS FOR GAS TURBINES

Donald E. Carr, Bartlesville, Okla., assignor to Phillips Petroleum Company, a corporation of Delaware Application October 23, 1950, Serial No. 191,662

12 Claims. (Cl. 60—35.6)

This invention relates to jet engines. In one of its more specific aspects it relates to a means for providing selected fuels for a jet engine. In another of its more specific aspects it relates to a control device for a dual fuel system for a gas turbine. In another of its more specific aspects it relates to the operation of jet engines under widely varying conditions which require different types of fuels for operation under best conditions at marginal limits.

Jet engines have only in the last few years been used in large numbers for the purpose of propelling aircraft and they have been found to be highly advantageous for use in high speed planes. With the increase in use of such engines, however, a multitude of operational problems have also come to be recognized.

A jet engine comprises three general parts: first, an air intake section; second, a fuel addition and combustion section; and third, an exhaust section. In a turbojet engine, the air intake section and means for effecting such air intake employs a rotating compressor, such as a turbine compressor, operated by a gas turbine as motivating power for introducing the air into the combustion section. The purpose of operation of such an engine is to burn the fuel and to utilize as much as possible of the heat energy added in producing thrust for the engine. In the gas turbine engine, the combustion gases pass through a turbine which utilizes part of the heat energy in the gas engines in driving the compressor so as to furnish additional air for the combustion zone. The gases then are exhausted to the atmosphere through the exhaust section or tail pipe with a concomitant production of thrust.

Best operation of turbojet engines under conditions requiring peak power output is obtained by introduction of a portion of fuel into what is known as an afterburner. In a sense, an afterburner can be regarded as a ramjet connected to the downstream end of an ordinary turbojet. Afterburners operate at a lower oxygen content than the primary combustion zones of such engines. Under such conditions the problem of maintaining combustion within such a section is a serious one. Because of the complex combustion problems which are encountered in the afterburner, a high performance fuel is to be desired for introduction thereinto.

The general trend of thought concerning the operation of jet engines has been that hydrocarbons do not vary sufficiently in their burning characteristics to make a material difference in the operation of any given jet engine. For that reason, emphasis has for some time been placed on engine research so as to determine the design of a jet engine which would have such a structure as would overcome the multitude of operational difficulties which are inherently encountered in jet engines. Such operational difficulties have to date been only partially overcome by engine design.

The problems which are encountered in the operation of a turbojet engine exemplify those encountered in other jet engines. Performance of a jet engine is dependent to a large extent upon the "temperature rise" which is obtainable in the particular engine. "Temperature rise" is that increase in temperature between the inlet to the combustor and the temperature of the gases in the combustor exhaust outlet. In a turbojet engine the temperature rise must be carefully controlled for the operation of a turbojet engine is limited by the ability of the turbine blades to withstand high temperature. Fuel which is supplied to the combustor is burned in the presence of supplied air and raises the temperature of the combustion gases and unused air by the heat of combustion. An excess of air is conventionally utilized in the operation of turbojet engines to control the temperature of the gases contacting the turbine blades. Such a large quantity of air is utilized in the operation of jet engines that the air flow reaches very high velocities. The high air velocities pose many additional problems in the operation of jet engines, which problems are very difficult to overcome. The hot gases are expanded and in the turbojet engine are expanded through the turbine section which provides power for the compressor. Further expansion of the gases in the turbojet engine takes place through a rearwardly extending exhaust nozzle to provide a substantial increase in gas velocity. The thrust which is produced by the engine equals the gas mass flowing through the exhaust duct times its increase in speed according to the law of momentum.

For each engine speed at a given altitude, a certain temperature rise is required for the operation of any given jet engine. Combustor inlet pressure, fuel atomization, and mass air flow through the engine impose a limitation upon the combustion of any fuel utilized in the operation of the engine. For each combination of combustor inlet pressure, fuel atomization, and mass air flow there exists for any given fuel a maximum attainable temperature rise which depends upon the combustion stability performance of that fuel under the combination of these conditions. As the operation conditions become more severe, a decrease in combustion stability is encountered. One phenomenon which tends to affect temperature rise in any given engine is known as "cycling." Cycling is an indication of instability of combustion of a given fuel. The flame front within the combustor tends to fluctuate back and forth and many times the instability reaches such a degree that the flame is finally extinguished. The point at which combustion will no longer be sustained is known as the "blow-out" or "cut-out" point. Blow-out is the primary controlling characteristic of turbojet engine performance since it defines the thrust output limits at a given altitude. When the temperature rise required at a given engine speed and at a given altitude corresponds to the maximum temperature rise obtainable with a given fuel, a very definite operational limit is imposed upon that jet engine when operating with that specific fuel. In order to operate the engine under more severe operating conditions, it is necessary therefore to obtain and use a fuel which has stable combustion characteristics over a broader range of conditions than the fuel with which the maximum limit of operation has been reached. Similar operational problems are encountered in pulse jet and ram jet engines.

It has been found that many of the operational problems of such jet engines are overcome to a large extent when those engines are operated with a particular hydrocarbon fuel. Hydrocarbon fuels, contrary to general belief, burn differently under different operating conditions. It will thus be seen that although stress has been placed upon research for mechanical design of jet engines, a further limitation is placed upon the individual engines by the particular fuel being utilized. A desirable jet engine fuel should be readily burnable and should facilitate maintenance of the flame in the combustion zone. The fuel should also produce a high thrust for each unit volume burned and should not cause difficulty such as fouling the engine or fuel injection system.

Hydrocarbon fuels which satisfactorily meet the above requirements should be rated in an order of desirability by their ability to impart heat to air entering the combustion zone while maintaining stable combustion therein. Fuels may be rated generally in their order of desirability by operating a particular burner under a particular set of operating conditions which include combustion zone inlet air temperature, mass rate of air flow, and constant outlet pressure. An increase in the rate of fuel addition, when the above conditions are fixed, increases the temperature rise of the air in the combustion zone up to a critical point and after that point has been reached any increase in fuel addition results in decreasing the temperature of the combustion gases. A comparison of the maximum temperature rise ($\Delta Tm$) with the $\Delta Tm$ obtained with two standard fuels, normal heptane and 2,2,4-trimethylpentane (isooctane) obtained in the same burner and under the same operating conditions make possible the rating of the tested fuel under such operating conditions. Assigning n-heptane and isooctane arbitrary values of combustion stability of 100 and 0, respectively, the relative combustion stability rating of the test fuel is calculated from the following relation:

$$\sigma = \frac{\Delta Tm,f - \Delta Tm,o}{\Delta Tm,n - \Delta Tm,o} \times 100$$

$\alpha$ = Combustion stability rating
$\Delta Tm,f$ = Maximum stable temperature rise of the test fuel at the test conditions
$\Delta Tm,o$ = Maximum stable temperature rise of isooctane at the test conditions
$\Delta Tm,n$ = Maximum stable temperature rise of n-heptane at the test conditions The qualities which are chiefly required in jet fuels are (1) high density (because of volume rather than weight limitations on fuel carrying capacity); (2) high combustion efficiency; (3) wide range of stable combustion (freedom from blow-out from extreme altitude and accelerative conditions); (4) low freezing point; (5) low evaporation loss at altitude and at quick climb; and (6) low carbon-forming tendency.

Unfortunately, some of these requirements are hopelessly incompatible in the present state of the art. For example, it is not now possible to obtain high density, high combustion performance, and low carbon-forming tendencies from the same fuel as determined by the above method of determining combustion stability. However, as in the case of piston engines, the need for high combustion performance is only an intermittent one and represents, particularly in the case of long range craft such as bombers or transport planes, a relatively small fraction of the total operating time or fuel load.

I have conceived a means and method of operating a jet engine so as to provide fuels for operation of that engine as required by the operating conditions to which the engine is subjected. I propose to use a dual fuel system for turbojet operation. A relatively small tank of fuel of high combustion performance (as shown by high flame speed, for example) is carried separate from a main fuel supply consisting of fuel possessing high density and low volatility but having relatively poor combustion performance under severe conditions. An automatic device actuated by a pick-up inversely responsive either to stagnation pressure in the combustion chamber inlet air or to turbine inlet temperature or to other operating variables which measures severity of combustion conditions is used to control a valve system which causes the introduction into the combustion chamber of high performance fuel under those conditions in which it is needed to replace the main fuel. In the case of jet engines in which an afterburner is used, a portion of such high performance fuel is preferably separately fed into the afterburner under conditions requiring extra thrust. Under mild conditions, however, such as in steady state cruise, the afterburner system is preferably cut out coincidental with suitable adjustment with a variable area nozzle.

Numerous practical advantages can be cited for the dual fuel system in addition to the obvious one of obtaining a satisfactory balance between all of the requirements for jet engine fuels set forth above. For example, an afterburner operating only on high flame speed fuel would not require the elaborate flame holder blockage which is now employed for inferior fuels and pressure losses would hence be greatly reduced. In the main combustor, turbulence and vorticity resulting from the necessity of designing the combustion chamber for stable operation on inferior fuels under severe conditions would be considerably lessened. From the standpoint of carbon-forming tendencies, the auxiliary fuel of high combustion efficiency may be selected not only from the standpoint of clean burning by itself, but for aiding in the burning off of deposits during the use of the main jet fuel.

Examples of very high performance fuel for use in the auxiliary fuel system are propylene oxide and similar oxides, compounds of furan structure, ethers, alpha olefins, and normal paraffins. Typical of high density main fuels would be cat-cracked cycle stock and solvent extracts in the kerosene or gas oil boiling range.

An object of this invention is to provide an improved means for operating turbojet engines. Another object of the invention is to provide an improved method for operating turbojet engines. Another object of the invention is to provide an improved control device for a dual fuel system for a gas turbine. Another object of the invention is to provide a means and method for selecting and feeding a fuel having necessary properties to obtain satisfactory operation under all limits of turbojet engine operation at the greatest possible economy and efficiency. Another object of the invention is to provide a means and method for materially reducing the pressure losses encountered in turbojet engines. Another object of the invention is to provide a means and method for lessening turbulence and vorticity losses in the combustor chamber of turbojet engines. Other and further objects and advantages will be apparent to those skilled in the art upon study of the accompanying disclosure.

Better understanding of this invention will be obtained by those skilled in the art upon study of the accompanying drawings in which Figure 1 is a schematic fuel control and electrical flow diagram utilized in the operation of my control device for the dual fuel system for gas turbines. Figure 2 is a preferred modification of a fuel control and electrical flow diagram of this invention. Figure 3 is a cross-section of the throttle control member taken along the line 3—3 of Figure 1. Figure 4 is a diagrammatic representation of a turbojet engine showing the relationship between the control device for dual fuel systems and the turbojet engine.

Referring particularly to Figure 1 of the drawings, a number of switches are diagrammatically shown by pairs of indicated electrical contact members. Bellows 11 is evacuated and is connected at one end to contact member 12. Bellows 11 is preferably positioned at the outlet end of the compressor of a turbojet engine so as to be subjected to any increase or decrease of air pressure therefrom. If the pressure decreases, bellows 11 extends so as to cause contact member 12 to extend in a longitudinal direction. As pressure increases, bellows 11 is compressed, thereby causing the retraction of contact member 12 in a longitudinal direction. Tachometer 13 is connected by member 14 to a generator, not shown, which in turn is driven by the engine or turbine. As the engine speed increases, a current is set up through electrical conduit 15 which conduit provides a wrapping for solenoid 16. As the current passes through electrical conduit 15, solenoid 16 is energized and causes its core which is rigidly connected to contact member 17 to be drawn into the magnetic field set up therein. Contact member 17 is thus drawn toward solenoid 16. As the engine speed decreases, the current passed through electrical conduit 15 likewise decreases, thus proportionately de-energizing solenoid 16 allowing its core member to be extended by a spring loading, not shown. As the pressure and engine speed decrease, contacts 12 and 17 extend in opposite longitudinal directions until they make contact with one another. As contacts 12 and 17 come together they close one portion of an electrical circuit. Electrical conduit 18 is connected to contact member 12 and electrical conduit 19 is connected to contact member 17. Electrical conduit 18 is connected to a power supply 21 by means of electrical conduit 22.

Fuel tank 23 contains a high performance fuel described above. Float member 24 is operatively connected to a contact member 25, preferably positioned outside of tank 23, contact member 25 being moved in response to movement of float member 24 within tank 23. Contact member 25 is connected to electrical conduit 19 by means of electrical conduits 26, 27, and 28. Electrical conduit 29 is connected at one end to power supply source 21 and provides wrappings for solenoid 31 being connected at its opposite end to contact member 32. When float member 24 is raised in any respect from the bottom of fuel tank 23, contact members 25 and 32 are brought together, thus completing the circuit set up through electrical conduits 18; contact member 12, contact member 17, electrical conduits 19, 28, 27, 26, contact members 25 and 32, and electrical conduit 29.

When the electrical circuit is closed by bringing together contact members 12 and 17 and 25 and 32, respectively, solenoid 31 is energized so as to draw its core into the magnetic field set up therein. The core of solenoid 31 is rigidly connected to drive member 33 which in turn is connected to valve 34. Valve 34 comprises two valve heads which are spaced apart and connected by a common valve stem which forms drive member 33. The two valve heads are fitted within valve housing 48 which is provided with fuel inlets 47 and 52 spaced apart longitudinally therein. When one valve head closes one fuel inlet the other valve head opens the other inlet. As valve 34 is drawn in the direction of solenoid 31 by the core thereof, connection member 35 which is pivotally connected to member 33 at pivot 36 and is also pivoted from a stationary member at pivot 37, is caused to move toward solenoid 31 at its upper end and to move contact member 38 affixed to the lower end of member 35 into contact with contact member 39 which is, under normal conditions, spaced from contact member 38 which contacts together with contact 55 form a selector switch. Contact member 39 is connected by means of electrical conduit 41 to power supply 42. Contact member 38 is connected by means of electrical conduits 43 and 44 to electrical pump 45. Pump 45 is connected to power supply source 42 by means of electrical conduit 46. Pump 45 is provided in fuel conduit 47 which extends from fuel tank 23 to valve housing 48.

As solenoid 31 is energized so as to draw valve 34 in the direction of the solenoid and thus cause contact between contact members 38 and 39, valve head 49 is caused to open conduit 47 and valve head 51 is caused to close fuel conduit 52 which extends from fuel tank 53, tank 53 containing the main fuel for operation of the turbojet engine. As contact members 38 and 39 are brought together the electrical circuit from power supply source 42 through pump 45 and contact members 38 and 39 is completed causing pump 45 to go into operation and supply fuel from tank 23 through conduit 47 and valve housing 48 to a fuel metering control, not shown, through fuel conduit 54. Although only a single fuel outlet 54 is shown from valve housing 48, individual fuel outlets can be provided so as to be alternately opened and closed as are inlet conduits 47 and 52.

As the engine speed increases or as the compressor outlet pressure increases, contact members 12 and 17 are caused to retract in opposite longitudinal directions, thus breaking the contact therebetween and de-energizing solenoid 31. As solenoid 31 is de-energized a spring loading therein, not shown, causes its core to extend therefrom thus causing valve 34 to move in a direction away from solenoid 31. At the same time member 35 is pivoted at 37 so as to cause a break between contacts 38 and 39, thus inactivating motor 45. As valve 34 moves away from solenoid 31, valve head 49 closes conduit 47 and valve head 51 opens conduit 52. Contact member 36 on member 35 is caused to come into contact with contact member 55. Contact member 55 is connected to power supply 56 by means of electrical conduit 57. Contact member 38 is connected by means of electrical conduit 44 to electrical pump 58. Electrical pump 58 is also connected to power supply 56 by electrical conduit 59. Thus as contact members 38 and 55 are brought together an electrical circuit which includes those two contact members and pump 58 is closed, causing pump 58 to go into operation. Valve head 51 is caused to open fuel conduit 52 as fuel conduit 47 is closed, thus allowing the main fuel from tank 53 to be pumped through fuel conduit 52, valve housing 48, and fuel conduit 54 to the fuel metering control, not shown. Although the valve system has been shown as being contained in a single housing 48 it is clearly within the scope of this invention to utilize two separately housed valves actuated by solenoid 31.

Float member 61 within fuel tank 53 is connected to contact members 62 and 63 which are preferably provided outside of fuel tank 53. Contact members 62 and 63 are caused to move in response to movement of float member 61 within fuel tank 53. Contact member 64 is connected to one end of electrical conduit 28. Contact member 65 is connected by means of electrical conduit 66 to electrical conduit 44. As the level of fuel within fuel tank 53 decreases to such an extent that float member 61 drops to the bottom of that tank, contact members 63 and 62 are brought into contact with members 64 and 65, respectively, so as to close the circuit which includes power source 21, solenoid 31, and pump 45 causing conduit 52 to be closed and conduit 47 to be opened by valve 34, and pump 45 to be actuated so as to supply fuel from tank 23 through valve housing 48 and conduit 54 to fuel metering control, not shown. Contact members 62 and 65 form a safety switch which assures the completion of the electrical circuit to actuate pump 45.

Under some energizing conditions, such as in combat or extremely high rate of climb, it is desirable to provide manual actuated control means whereby the pilot can over-ride the automatic system of fuel control so as to supply the high performance fuel to the jet engine. This manual control means is provided by placing a flexible contact member 67 at the full advance end of the throttle arm bracket. Contact member 67 is connected to electrical conduit 19. Contact member 68 is connected to one end of electrical conduit 18 and is positioned so as to be in the path taken by contact member 67 as it is flexed under pressure exerted by the throttle control lever 69 as it is forced into a fully advanced position by the pilot. As contact member 67 is forced into contact with contact member 68, the electrical circuit which includes power source 21, solenoid 31, and pump 45 is completed so as to cause fuel conduit 47 to be opened to the flow of fuel from tank 23, thus supplying high performance fuel for jet engine operation.

Under some conditions of operation such as in rainy weather and the like, it is desirable to operate a turbojet engine with high performance fuel without extending the jet engine to full power performance. For that reason a second manual control over-riding means is provided by which the pilot is enabled to selectively feed the high performance fuel to the jet engine rather than the main fuel. Better understanding of this second manual selection device will be obtained upon reference to Figure 3 of the drawings. Throttle lever 69 comprises an outer shell 71 and a rotatable shaft 72 provided therein. A slot 73 is provided within shell 71 so as to provide free rotational movement therein of contact members 74 and 75 with shaft 72. As shaft 72 is rotated within shell 71 by means of handle 76 shown in Figure 1, contact member 75 is brought into contact with a shoulder within shell 71 and is prevented from continuing its path of rotation. As further force of rotation is exerted upon handle 76, shaft 72 forces contact member 74 into contact with contact member 75. Contact 75 is connected to electrical conduit 27 and contact 74 is connected to electrical conduit 18 by means of electrical conduit 77. Thus as contacts 74 and 75 are brought together, the electrical circuit which includes power source 21, solenoid 31, and electrical pump 45 is completed so as to bring about the supply of fuel from tank 23 through fuel conduit 47 and to cut off the supply of fuel from tank 53 through fuel conduit 52 as discussed above.

When float 24 is lowered to the bottom of tank 23 by reason of substantially total removal of fuel therefrom, contacts 25 and 32 are caused to separate, thus breaking the circuit and de-energizing solenoid 31 and in that manner stopping pump 45 and closing conduit 47. As contacts 25 and 32 are separated, contacts 78 and 79 which form a safety switch are brought together. That closes the circuit which includes electrical conduits 80, 57, power source 56, conduit 59, pump 58, and conduits 44, 43, and 70. Pump 58 is put into operation in this manner so as to supply fuel through conduit 52, valve housing 48, and conduit 54 to fuel metering control, not shown.

The device set forth in Figure 2 of the drawings includes one additional very important operational condition as a controlling feature for the selection of a fuel for the turbojet engine. Temperature as well as pressure of the air supply is used in conjunction with engine speed so as to control the selection of the fuel charge. These three variables are individually sensed by separate mechanisms and the fuel is charged to the engine as chosen thereby. Bellows 81 is responsive to temperature and may be actuated by the air temperature at the inlet or outlet of the compressor. The bellows may be filled with a liquid which expands with an increase and contracts with a decrease in temperature and is connected by means of conduit 82 to a liquid supply source, not shown, at the point chosen for temperature sensing. Bellows 11 may be enclosed within a chamber 83, which chamber is connected to the compressor outlet by means of conduit 84. Bellows 11, as described in connection with Figure 1, is caused to elongate upon a decrease in pressure and to contract upon an increase in pressure. Bellows 81 and 11 are pivotally connected to arm 85 which is provided with contact member 86 at one of its ends. Contact 86 is thus caused to move in response to the combination of action of bellows 11 and 81 thereon in response to temperature and pressure within the turbojet engine. Solenoid 16 is energized as described in connection with Figure 1 of the drawings in response to engine speed, contact member 17 extending as engine speed decreases and being retracted as engine speed increases. Contact member 25 which moves in response to the position of float member 24 within fuel tank 23 contacts contact member 87 until float member 24 is dropped to the bottom portion of fuel tank 23 by reason of a total removal of fuel from that tank. Thus as contact members 17 and 86 are brought together by the effect of temperature, pressure, and engine speed thereon, upon contact, a circuit is completed which includes electrical conduits 88 which extends between contact member 17 and contact member 87, conduit 89 which provides a wrapping for solenoid 31, power supply source 42, and electrical conduit 91 which is connected to member 85. As solenoid 31 is actuated, valve 34 is caused to move as described in connection with the operation of the device shown in Figure 1 of the drawings. Thus flow of fuel from tank 53 through conduit 52 is stopped and flow of fuel through conduit 47 from tank 23 is started. In this specific modification, a single pump 92 is provided which remains in constant operation in connection with conduit 54. Thus one or the other of the fuels is supplied to the fuel metering control by the constant operation of pump 92. Contact member 93 is connected to electrical conduit 89 by means of electrical conduit 94. As float member 61 drops to the bottom of fuel tank 53 upon the substantially total removal of fuel therefrom, contact member 63 is brought into contact with contact member 93, thereby closing the circuit which includes electrical conduits 94, 89, power supply 42, electrical conduit 91, and electrical conduit 95 which extends between conduit 91 and contact member 63. In this manner an automatic arrangement is provided whereby the high performance fuel is supplied to the engine at any time that the supply of fuel in tank 53 becomes depleted. Pairs of switches which have been described hereinabove diagrammatically represent switches which are opened or closed in the manner described.

Although a single pump 92 has been shown in connection with this specific modification, it is within the scope of this invention that individual pumps may be provided in conduits 47 and 52 as described and shown in connection with Figure 1 of the drawings, these individual pumps being actuated in the manner described in connection therewith.

Specific operation of a turbojet engine by means of the control system described above will be better understood upon reference to Figure 4. Air is introduced into turbojet engine 101 at inlet 102 thereof. The air is passed through compressor section 103, which compressor is driven by turbine 104 downstream of combustor section 105. Contact members 12 and 17 are extended or retracted as described in connection with Figure 1 of the drawings. Contact member 12 could be replaced by a contact member 82 as described in connection with Figure 2. Fuel which is selected by the variable conditions obtained from within the turbojet engine is fed from fuel tanks 23 or 53 to the forward end of combustor section 105. The fuel is burned within combustor section 105 and the expanded gases pass downstream through turbine 104 so as to provide rotation thereof. As pointed out above, an afterburner is a rather inefficient section of a turbojet engine, and for that reason a high performance fuel is ordinarily desired for the operation thereof. Thus in the method of operation which I propose, valve 106 is opened upon actuation of pump 45 by closure of its actuating circuit so as to supply high performance fuel to afterburner section 107. Valve 106 is closed when the actuating circuit for pump 45 is opened. The total expanded gases obtained from the combustor section and the afterburner section are exhausted through exhaust nozzle 108 providing the thrust for the jet engine.

Many modifications of this invention will be apparent to those skilled in the art upon study of the accompanying disclosure and the drawings. These modifications will be obvious and are believed to be within the spirit and the scope of this disclosure.

I claim:

1. In a turbojet engine comprising a compressor, a combustion chamber, a turbine, an exhaust nozzle, a first fuel tank and a second fuel tank, a first fuel outlet conduit from said first fuel tank, and a second fuel outlet conduit from said second fuel tank; in combination with a fuel control system which comprises a first solenoid, a valve system in said first and second fuel outlet conduits alternately open in one and closed in the other said fuel conduit and operatively connected to said first solenoid, at least one fuel conduit extending between said valve system and said combustor, a first power means, a first circuit operatively connecting said first power means to said first solenoid, first switch means in said first circuit and comprising a first contact member moveable by operation of a pressure compressible member operatively connected to the downstream end of said compressor and a second contact member contactable with said first contact member and moveable by operation of a second solenoid operatively connected to said turbine, a first liquid level gauge in said first fuel tank, second switch means connected in said first circuit and said first liquid level gauge and operable by said first gauge as fuel in said first fuel tank becomes depleted, a throttle assembly comprising a hanger member having mounted thereon a throttle lever, third switch means in said throttle lever and operable by rotation of one portion of said throttle lever within another portion thereof, said third switch means being connected in parallel to contacts of said first switch means, fourth switch means on said hanger member operable by said throttle lever in its most advanced open position, said fourth switch means being connected in parallel to contacts of said first switch means, a second liquid level gauge in said second fuel tank, fifth switch means connected in parallel to contacts of said first switch means and said second liquid level gauge and closeable by said second liquid level gauge as fuel in said second fuel tank becomes depleted.

2. The combination of claim 1, wherein a first electric pump is in said first fuel outlet conduit, a second electric pump is in said second fuel outlet conduit, a second power means, a third power means, a selector switch operatively connected to said first solenoid, a second circuit operatively connecting said second power means to said first electric pump and said selector switch, and a third circuit operatively connecting said third power means to said second electric pump and said selector switch.

3. The combination of claim 2, wherein a first safety switch is connected to said first liquid level gauge and is connected in parallel to contacts of said selector switch in said third circuit, said first safety switch being closed by said first liquid level gauge upon depletion of fuel in said first fuel tank.

4. The combinataion of claim 3, wherein a second safety switch is connected to said second liquid level gauge and is connected in parallel to contacts of said selector switch in said second circuit, said second safety switch being closed by said second liquid level gauge upon depletion of fuel in said second fuel tank.

5. The combination of claim 1, wherein a first electric pump is in said first fuel outlet conduit, a second electric pump is in said second fuel outlet conduit, a second power means, a third power means, a selector switch operatively connected to said first solenoid, a second circuit operatively connecting said second power means to said first electric pump and said selector switch, a third circuit operatively connecting said third power means to said second electric pump and said selector switch, a safety switch connected to said second liquid level gauge and is connected in parallel to contacts of said selector switch in said second circuit, said second safety switch being closed by said second liquid level gauge upon depletion of fuel in said second fuel tank.

6. The combination of claim 1, wherein said valve system comprises a single elongated valve housing having two fuel inlets longitudinally spaced apart therein and a single fuel outlet provided midway between said fuel inlets, two valve members having a common stem being slidably fitted within said valve housing, said valve members being spaced apart so as to alternately close one of said fuel inlets and open the other and constantly maintain said fuel outlet open to flow of fuel from the open fuel inlet.

7. The combination of claim 1, wherein said throttle lever comprises a hollow support member having a slot provided in a portion of its inner periphery pivotally affixed at one end to said hanger member, a handle member extending into and rotatably supported by and retained within said hollow support member, a first contact member provided in said slot, and a second contact member mounted on said handle member within said slot and contactable with said first contact member by rotation of said handle member, said first and second contact members comprising said third switch means being connected in parallel to said contacts of said first switch means.

8. The combination of claim 1, wherein said turbojet engine is provided with an afterburner intermediate said turbine and said exhaust nozzle, a first electric pump is in said first fuel outlet conduit, a second electric pump is in said second fuel outlet conduit, a second power means, a third power means, a selector switch operatively connected to said first solenoid, a second circuit operatively connecting said second power means to said first electric pump and said selector switch, a third circuit operatively connecting said third power means to said second electric pump and said selector switch, at least one afterburner fuel conduit extending between said valve system and said afterburner, and a valve in said afterburner fuel conduit operatively connected to said second circuit so as to be opened by closure of said second circuit.

9. In a turbojet engine comprising a compressor, a combustion chamber, a turbine, an exhaust nozzle, a first fuel tank and a second fuel tank, a first fuel outlet conduit from said first fuel tank, and a second fuel outlet conduit from said second fuel tank; in combination with a fuel control system which comprises a first solenoid, a valve system in said first and second fuel outlet conduits alternately open in one and closed in the other said fuel conduit and operatively connected to said first solenoid, at least one fuel conduit extending between said valve system and said combustor, a first power means, a first circuit operatively connecting said first power means to said first solenoid, first switch means in said first circuit and comprising a first contact member moveable by operation of a second solenoid operatively connected to said turbine and a second contact member contactable with said first contact member and moveable by the operation of a temperature expansible member and a pressure retractable member operatively connected to said compressor, said first and second contact members being subjected to contact by de-energizing said second solenoid and applying the combined actions of said temperature expansible and pressure retractable members to said second contact member, a first liquid level gauge in said first fuel tank, second switch means connected in said first circuit and said first liquid level gauge and operable by said first gauge as fuel in said first fuel tank becomes depleted, a throttle assembly comprising a hanger member having mounted thereon a throttle lever, third switch means in said throttle lever and operable by rotation of one portion of said throttle lever within another portion thereof, said third switch means being connected in parallel to contacts of said first switch means, fourth switch means on said hanger member operable by said throttle lever in its most advanced open position, said fourth switch means being connected in parallel to contacts of said first switch means, a second liquid level gauge in said second fuel tank, fifth switch means connected in parallel to contacts of said first switch means and said second liquid level gauge and closeable by said second liquid level gauge as fuel in said second fuel tank becomes depleted.

10. The combination of claim 9, wherein said throttle lever comprises a hollow support member having a slot provided in a portion of its inner periphery pivotally affixed at one end to said hanger member, a handle member extending into and rotatably supported by and retained within said hollow support member, a first contact member provided in said slot, and a second contact member mounted on said handle member within said slot and contactable with said first contact member by rotation of said handle member, said first and second contact members comprising said third switch means being connected in parallel to said contacts of said first switch means.

11. A turbojet engine fuel control system for supplying fuel to a combustor which comprises a first fuel tank and a second fuel tank, a first fuel outlet conduit from said first fuel tank, and a second fuel outlet conduit from said second fuel tank, a first solenoid, a valve system in said first and second fuel outlet conduits alternately open in one and closed in the other said fuel conduit and operatively connected to said first solenoid, at least one fuel conduit extending between said valve system and said combustor, a first power means, a first circuit operatively connecting said first power means to said first solenoid, first switch means in said first circuit and comprising a first contact member moveable by operation of a pressure compressible member operatively connected to the downstream end of said compressor and a second contact member contactable with said first contact member and moveable by operation of a second solenoid operatively connected to said turbine, a first liquid level gauge in said first fuel tank, second switch means connected in said first circuit and said first liquid level gauge and operable by said first gauge as fuel in said first fuel tank becomes depleted, a throttle assembly comprising a hanger member having mounted thereon a throttle lever, third switch means in said throttle lever and operable by rotation of one portion of said throttle lever within another portion thereof, said third switch means being connected in parallel to contacts of said first switch means, fourth switch means on said hanger member operable by said throttle lever in its most advanced open position, said fourth switch means being connected in parallel to contacts of said first switch means, a second liquid level gauge in said second fuel tank, fifth switch means connected in parallel to contacts of said first switch means and said second liquid level gauge and closeable by said second liquid level gauge as fuel in said second fuel tank becomes depleted.

12. A turbojet engine fuel control system for supplying fuel to a combustor which comprises a first fuel tank and a second fuel tank, a first fuel outlet conduit from said first fuel tank, and a second fuel outlet conduit from said second fuel tank, a first solenoid, a valve system in said first and second fuel outlet conduits alternately open in one and closed in the other said fuel conduit and operatively connected to said first solenoid, at least one fuel conduit extending between said valve system and said combustor, a first power means, a first circuit operatively connecting said first power means to said first solenoid, first switch means in said first circuit and comprising a first contact member moveable by operation of a second solenoid operatively connected to said turbine and a second contact member contactable with said first contact member and moveable by the operation of a temperature expansible member and a pressure retractable member operatively connected to said compressor, said first and second contact members being subjected to contact by de-energizing said second solenoid and applying the combined actions of said temperature expansible and pressure retractable members to said second contact member, a first liquid level gauge in said first fuel tank, second switch means connected in said first circuit and said first liquid level gauge and operable by said first gauge as fuel in said first fuel tank becomes depleted, a throttle assembly comprising a hanger member having mounted thereon a throttle lever, third switch means in said throttle lever and operable by rotation of one portion of said throttle lever within another portion thereof, said third switch means being connected in parallel to contacts of said first switch means, fourth switch means on said hanger member operable by said throttle lever in its most advanced open position, said fourth switch means being connected in parallel to contacts of said first switch means, a second liquid level gauge in said second fuel tank, fifth switch means connected in parallel to contacts of said first switch means and said second liquid level gauge and closeable by said second liquid level gauge as fuel in said second fuel tank becomes depleted.

References Cited in the file of this patent
UNITED STATES PATENTS

| Number | Name | Date |
| --- | --- | --- |
| 1,334,491 | Henner | Mar. 23, 1920 |
| 1,486,058 | Ta'Bois | Mar. 4, 1924 |
| 1,991,021 | Leisten et al. | Feb. 12, 1935 |
| 2,142,979 | Hans | Jan. 3, 1939 |
| 2,163,241 | Huber | June 20, 1939 |
| 2,243,594 | De Voe et al. | May 27, 1941 |
| 2,311,828 | Hansen et al. | Feb. 23, 1943 |
| 2,545,856 | Orr, Jr. | Mar. 20, 1951 |